July 5, 1927.

I. L. EDWARDS 1,634,744

NUT LOCK

Filed May 14, 1923

Inventor
Isaac L. Edwards
By Chas. J. Williamson
Attorney

Patented July 5, 1927.

1,634,744

UNITED STATES PATENT OFFICE.

ISAAC L. EDWARDS, OF AURORA, ILLINOIS.

NUT LOCK.

Application filed May 14, 1923. Serial No. 638,966.

My invention relates to nut locks of the washer class which are bendable to engage the flat sides of the nut or bolt and my object is to provide such a lock that will be inexpensive to manufacture, capable of repeated use and easy to use but withal of the highest efficiency. My invention consists in whatever is defined by or included within the terms or meaning of the appended claims.

Figure 1:
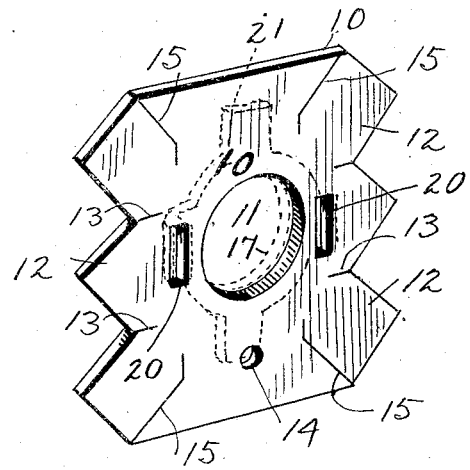
Fig. 1 is a perspective view of a nut lock made in accordance with my invention.

Briefly described my nut lock is a plate-form washer that is generally rectangular in form with its edges formed into numerous projections any one of which is bendable to contact with an adjacent flat surface of the nut or bolt whether the same be square, hexagonal or other polygonal form or contour and these projections have a form which has been produced by me with reference to economy of manufacture and utility in furnishing the lock, that is to say, I have had both these ideas in mind in giving form to the projections considered as projections and to the form of the washer as an entirety. The projections are the result of a serrated or saw tooth formation on two opposite sides of the washer the other two sides being preferably continuous and straight so that each may serve as an extending bearing against the top of the rail flange or other relatively stationary surface to hold the washer from turning.

Describing in detail what is shown in the drawing, the washer is a plate, 10, of bendable metal having a central hole, 11, to pass over the bolt and each of two opposite sides being serrated to form several similar straight sided teeth or projections, 12, each of which by a suitable tool may be bent upon the adjacent flat side of a nut or bolt head. As a plurality of projections is thus provided any one of which may be used at a time it will be seen that there may be reuse of the washer with different projections should a previously used projection be unavailable and any one of several projections may be used according to the particular position of the bolt or nut surface to be engaged or the form of the contour thereof. To facilitate the bending of each projection independently with the special reference of the possibility of various distances of the nut or bolt side to be engaged I cut slits, 13, into the body of the washer between adjacent projections.

The other two side edges of the plate, 10, which of course are parallel are straight so that either may serve as a bearing against the rail flange or other surface to hold the washer from turning and as either of such edges may be the acting one it will be seen that it is immaterial how the washer is applied to the bolt so that no particular care or attention is required in applying it. To enable the washer to be used with wood members where there is no surface for the straight edge of the washer to engage, a hole, 14, is punched therein for a nail or screw that will hold the washer from turning on the bolt.

Figure 2:
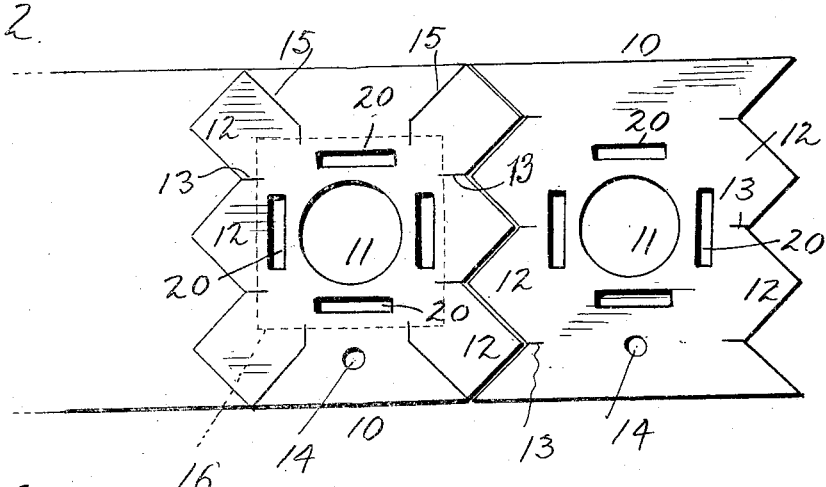
Fig. 2 is a view showing the procedure in making the same.
Figure 4:
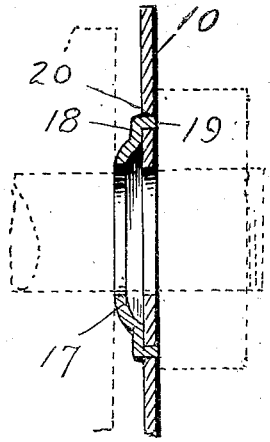
Fig. 4 is a section of said washer.

Reference to Fig. 2 will show that with the projections formed as has been described, the washer may be punched from a strip of metal of uniform width without any waste whatever from the formation of the projections, the strip of metal being cut in a regular zigzag line from side to side and its parallel edges furnishing the straight bearing edges of the washer. As shown in Fig. 2 washers cut from adjacent portions of the strip will be of different length along their straight edges but that is not objectionable. With the washer having the shorter of such straight edges, one of which is shown in Fig. 1 slits or incision, 15, are cut obliquely inward so that the end projections, 12, of the row on each side may be readily bent on a radial line from the bolt axis and it will be seen that in both forms appearing in Fig. 2 the opposite straight edge portions of the washer may be folded or bent over upon the side of a nut or bolt.

In Fig. 2 a nut, 16, is shown in dotted lines.

Figure 3:
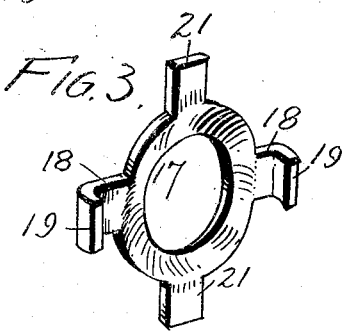
Fig. 3 is a perspective view of a supplemental washer that may be used.

I contemplate using, if desired, with my nut lock the ring form washer, 17, shown in Fig. 3 that is attached to the plate, 10, by radial fingers, 18, whose ends are bent to form lugs, 19, that project into matching slots, 20, cut or punched in the plate, 10, the washer, 17, being applied to the side of the plate, 10, so that it will lie next the fish plate or other adjacent surface of the part through which the bolt passes, the washer, 17, being dished or saucer-like and of spring material so that it will exert pressure when the nut is screwed to position. Preferably the washer, 17, has other radially projecting lugs, 21, which may be bent into engagement with the nut to lock same when the washer, 17, alone is used separate from or not in connection with a plate, 10. Each plate, 10, may be provided with two or more sets of slots, 20, as shown in Fig. 2.

What I claim is:

1. A nut lock formed of a substantially rectangular plate of bendable material, the plate having on opposite sides a straight line of straight sided angular projections, the sides of the projections converging outward and the two lines of projections being symmetrical and each line forming a zigzag contour, the other two sides of the plate being straight and incisions extending obliquely inward from each extremity of said straight edges.

2. A nut lock formed of a substantially rectangular plate of bendable material, the plate having on opposite sides a straight line of straight sided angular projections, the sides of the projections converging and the two lines of projections being symmetrical, and each line forming a zigzag contour, the other two sides of the plate being straight and incisions extending obliquely inward from each extremity of said straight edges.

3. A nut lock formed of a substantially rectangular plate of bendable material the plate having on opposite sides a straight line of straight sided angular projections, the plate having incisions where the projections meet the side projections converging outward from said incisions and the two lines of projections being symmetrical and each line forming a zig-zag contour.

4. The method of making nut locks which consists in taking a strip of metal with parallel straight edges and cutting the same in two at spaced intervals by a zigzag line that extends continuously from one edge of the plate to the other and making obliquely extending inward incisions from the straight edges.

In testimony whereof I hereunto affix my signature.

ISAAC L. EDWARDS.